3,479,382
PREPARATION OF TERTIARY ALKYLAMINE ALANES
Gottfried J. Brendel, Baton Rouge, La., assignor to Ethyl Corporation, New York, N.Y., a corporation of Virginia
No Drawing. Continuation of application Ser. No. 390,225, Aug. 17, 1964. This application Apr. 4, 1968, Ser. No. 718,956
Int. Cl. C07f 5/06
U.S. Cl. 260—448       8 Claims

ABSTRACT OF THE DISCLOSURE

The preparation of an amine alane by heating a tertiary alkylamine alkylaluminum hydride complex containing alkyl groups having from 1 to 6 carbon atoms per group to a temperature less than the temperature of decomposition of the alane in a non-oxidizing atmosphere to effect redistribution of the teritary alkylamine alkylaluminum hydride complex whereby the corresponding amine alane is produced along with aluminum compounds as a by-product.

---

This application is a continuation of application Ser. No. 390,225, filed Aug. 17, 1964 and now abandoned.

The present invention pertains to a process for the preparation of amine alanes. More specifically, the present invention pertains to a novel process for the preparation of the tertiary amine aluminum hydride complexes finding diverse uses in the chemical and allied arts.

Amine aluminum hydride complexes and methods for their preparation are known in the art, for example as reported by E. Wieberg, H. Graf, R. Uson in their publication entitled "About Monomeric Aluminum Hydride $AlH_3$," Z. anorg, allegen. Chem. 272 221-32 (1953), they can be obtained by conversion of ethereal solutions of aluminum chloride and lithium alanate to produce an ethereal $AlH_3$ solution to which is added a tertiary amine to prevent polymerization of the ether-soluble $AlH_3$ to ether-insoluble, solid, polymeric $(AlH_3)_x$. In this manner, stable ether-soluble aminates of the composition $AlH_3 \cdot NR_3$ and $AlH_3 \cdot 2NR_3$ are formed. While amines alanes are readily produced by thta process and modifications thereof, these processes are not commercially attractive inasmuch as the raw materials are relatively expensive and difficult to handle. Therefore, a process utilizing more economically attractive raw materials which are easier to handle would be a welcomed contribution to the art.

An object of this invention is to provide a novel process for the preparation of amine alanes.

A more specific object of this invention is to provide a process for the preparation of tertiary amine aluminum hydride complexes utilizing relatively inexpensive raw materials to produce such materials in a most expeditious manner.

These and other objects will come to light as the discussion proceeds.

The above objects are accomplished by the instant invention which provides a process for the preparation of amine alanes comprising heating a tertiary alkylamine alkylaluminum hydride complex to less than the temperature of decomposition of the alane in a non-oxidizing atmosphere to effect redistribution of the tertiary alkylamine alkylaluminum hydride complex whereby the corresponding amine alane is produced in good yield together with alkylaluminum compounds as a by-product. While not wishing to be bound by theory, it is assumed that the reaction proceeds as follows:

$$3R_2AlH \cdot NR_3 \rightarrow 2R_3Al \cdot NR_3 + H_3Al \cdot NR_3$$

Among the advantages and unexpected features of the present process is the fact that a similar redistribution does not occur with the unsolvated or uncoordinated alkylaluminum hydrides under these conditions. Moreover, it is generally expected that the tendency of a Group III–A metal alkyl toward redistribution is retarded by a complex formation.

In conducting the present process temperatures up to the temperature of decomposition of the amine alane, which is generally less than about 150° C., are employed. A preferred temperature range, especially when preparing a trimethylamine alane utilizing the most preferred starting material, is within the range of from about 70° C. to about 120° C.

The present process is conducted in a non-oxidizing atmosphere to prevent decomposition of the starting material as well as of the amine alane product. A preferred process sequence is to heat the starting materials in a previously evacuated and purged vessel under reflux conditions. A vacuum is preferably maintained on the system by which means the amine alane product is removed and thereafter condensed. Operating in this manner provides for high reaction rates and facile separation of the desired product. However, this process can be conducted at atmospheric pressure or greater, if desired. Moreover, the non-oxidizing atmosphere can be provided by way of an inert medium, e.g. nitrogen, hydrogen, neon, argon, krypton, and the like.

Suitable raw materials for use in the instant invention are tertiary alkylamine alkyaluminum hydride complexes. Pursuant to the present discovery it has been found that such compounds undergo disproportionation whereby the corresponding amine alane and alkylaluminum compounds are produced. Preferred tertiary alkylamine alkylaluminum hydride complexes are those containing lower alkyl groups, viz. 1 to 6 carbon atoms per group, and especially those wherein the alkyl groups of the amine constituent are the same and the alkyl groups of the alkylaluminum hydride constituent are the same, e.g. as in the case of the trimethylamine diisobutylaluminum hydride complex. The latter compound is a preferred starting material since it is more readily available. Exemplary of other tertiary alkylamine alkylaluminum hydride complexes that can be employed in the instant invention are: trimethylamine dimethylaluminum hydride, trimethylamine, diethylaluminum hydride, trimethylamine ethylaluminum dihydride, triethylamine diethylaluminum hydride, tripropylamine ethylaluminum dihydride, trimethylamine isobutylaluminum dihydride, trimethylamine dihevylaluminum hydride, and the like.

The above starting materials are readily produced by various well known processes, for example diisobutylaluminum hydride can be prepared from triisobutylaluminum by de-alkylation or by reaction with aluminum powder and hydrogen at 500 p.s.i. at 150° C. The hydride so produced is then complexed with an amine.

The following examples are presented to illustrate the invention. All parts are by weight unless otherwise specified.

EXAMPLE I

Diisobutylaluminum hydride trimethylamine was prepared from trisobutylaluminum by (thermal) elimination of isobutylene at 140° C. in vacuo and by subsequent complexation of the resulting diisobutylaluminum hydride with trimethylamine. The apparatus employed consisted of a reaction flask fitted with a column-type temperature controlled reflux condenser, a Dry-Ice cooled U-trap connected to the overhead column discharge for collecting the volatile product fraction, manometers for pressure control and a vacuum pump.

The liquid diisobutylaluminum hydride trimethylamine complex contained in the apparatus under a nitrogen atmosphere was slowly heated to 80–90° C. at about 1 mm. Hg pressure. This temperature was maintained under reflux conditions for about 4 hours during which time the volatile products of the disproportionation reaction were continuously removed from the system by fractional condensation in the Dry-Ice cooled trap. The crystalline, white solid recovered from the trap was found to consist essentially of trimethylamine alane. The product can very effectively be purified by sublimation. The yield was estimated to be about 40 percent of the theory.

EXAMPLE II

The apparatus and procedure employed in this example was identical to that employed as above.

The starting material in this example was trimethylamine diethylaluminum hydride which was heated in the vacuum apparatus to a temperature of about 80° C. and then refluxed at this temperature for about 4 hours. The volatile product recovered from the Dry-Ice trap was found to consist essentially of trimethylamine alane. The yield was estimated as 50 percent of the theory.

EXAMPLE III

The same vacuum distillation apparatus as employed in the previous examples was used. The starting material was trimethylamine ethylaluminum dihydride which was slowly heated to 75–80° C. and thereafter refluxed at this temperature for 4–5 hours. The most volatile product fraction was collected in the Dry-Ice cooled trap. The crystalline white solid recovered from the trap was found to consist essentially of trimethylamine aluminum hydride. The yield was estimated to be 70–80 percent of the theory.

It is to be understood that variations can be made in the above process and the apparatus employed without departing from the true spirit and scope of the instant invention. For example, the process can be conducted on a continuous basis by continuously feeding an alkylaluminum hydride and tertiary amine to the reactor where disproportionation is effected by fractional distillation of the products.

Amine alanes produced pursuant to the present invention find diverse uses. For example, amine alanes such as the trimethylamine complex of aluminum hydride is an excellent material for preparing pure aluminum either in the form of aluminum coatings or aluminum powder by solution or vapor pyrolysis. Such coatings so derived are useful for the protection of steel fasteners against oxidation and/or corrosion and for the protection of superalloys against oxidation. Pure aluminum powder is readily produced by pyrolysis of trimethylamine complex of aluminum hydride in a non-oxidizing atmosphere. Similar uses are found for other amine alanes prepared pursuant to the present invention, e.g. the triethylamine complex of aluminum hydride, and the like.

The present compounds are also suitable as sources of storeable hydrogen and as reducing agents. The compounds are also useful in the preparation of other metal hydrides or complex aluminum hydrides.

I claim:
1. A process comprising the preparation of tertiary alkylamine alanes of the formula $H_3Al \cdot NR_3$ comprising heating a tertiary alkylamine alkylaluminum hydride complex of the formula $R_2AlH \cdot NR_3$ to less than the temperature of decomposition of the alane in a non-oxidizing atmosphere to effect redistribution of the tertiary alkylamine alkylaluminum hydride complex whereby the corresponding amine alane is produced in good yield together with trialkylaluminum tertiary alkylamine complex of the formula $R_3Al \cdot NR_3$ as a by-product.
2. The process of claim 1 further characterized in that said tertiary alkylamine alkylaluminum hydride complex contains alkyl groups having from 1 to 6 carbon atoms per group.
3. The process of claim 1 further characterized in that said tertiary alkylamine alkylaluminum hydride complex contains alkyl groups having from 1 to 6 carbon atoms per group, the alkyl groups of the amine constituent being the same and the alkyl groups of the alkylaluminum hydride constituent being the same.
4. The process of claim 1 further characterized in that said tertiary alkylamine alkylaluminum hydride complex is a trimethylamine diisobutylaluminum hydride complex.
5. The process of claim 1 further characterized in that said tertiary alkylamine alkylaluminum hydride complexes is a trimethylamine diethylaluminum hydride complex.
6. The process of claim 1 further characterized in that said tertiary alkylamine alkylaluminum hydride complex is heated to less than the temperature of decomposition of the alane which is less than about 150° C.
7. The process of claim 1 further characterized in that said tertiary alkylamine alkylaluminum hydride is heated to a temperature within the range of from about 70° C. to about 120° C.
8. A process for the preparation of a trimethylamine complex of aluminum hydride comprising heating a trimethylamine alkylaluminum hydride complex containing alkyl groups having from 1 to 6 carbon atoms per group to a temperature less than the temperature of decomposition of said trimethylamine complex of aluminum hydride and within the range of from about 70° C. to about 120° C. in a non-oxidizing atmosphere to effect redistribution of said trimethylamine alkylaluminum hydride complex.

References Cited
UNITED STATES PATENTS

| | | |
|---|---|---|
| 2,843,474 | 7/1958 | Ziegler et al. |
| 3,155,493 | 11/1964 | Tanaka et al. |
| 3,165,397 | 1/1965 | Lobo. |
| 3,170,787 | 2/1965 | Tanaka et al. |
| 3,326,955 | 6/1967 | Brendel et al. _____ 260—448 |

TOBIAS E. LEVOW, Primary Examiner

H. M. S. SNEED, Assistant Examiner